No. 732,502. PATENTED JUNE 30, 1903.
H. G. BANKS.
GRAZING MUZZLE.
APPLICATION FILED DEC. 22, 1902.
NO MODEL.
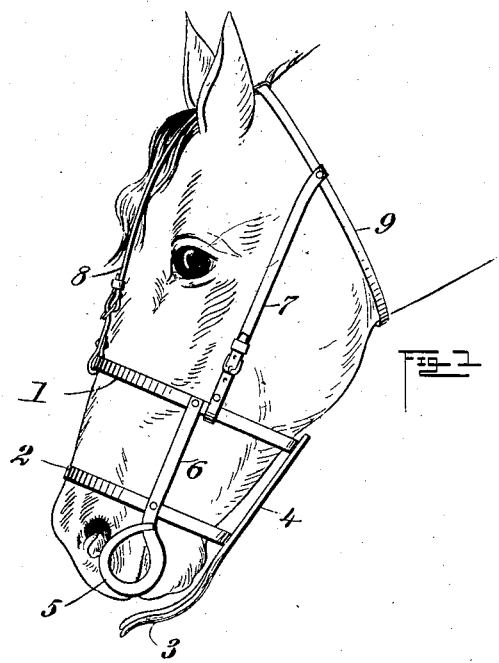
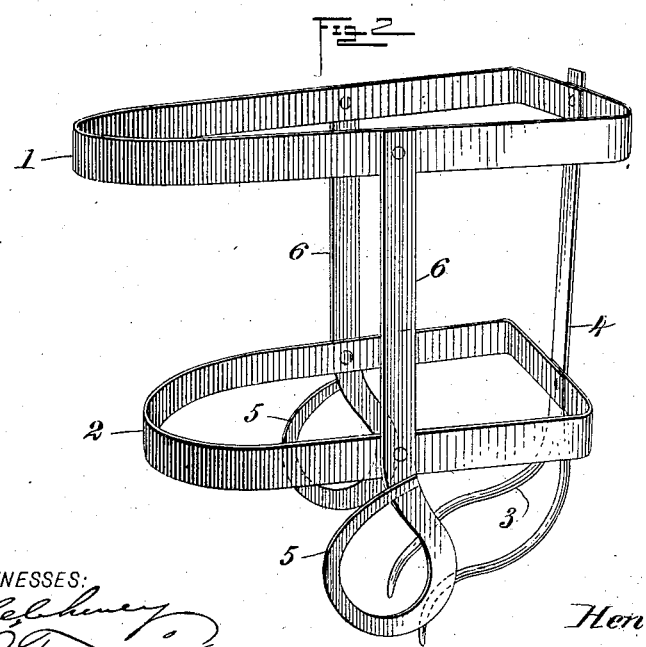
WITNESSES:
INVENTOR
Henry G. Banks
BY
ATTORNEYS.

No. 732,502. Patented June 30, 1903.

UNITED STATES PATENT OFFICE.

HENRY GREEN BANKS, OF BAUM, INDIAN TERRITORY.

GRAZING-MUZZLE.

SPECIFICATION forming part of Letters Patent No. 732,502, dated June 30, 1903.

Application filed December 22, 1902. Serial No. 136,163. (No model.)

*To all whom it may concern:*

Be it known that I, HENRY GREEN BANKS, a citizen of the United States, and a resident of Baum, Chickasaw Nation, Indian Territory, have invented a new and Improved Grazing-Muzzle, of which the following is a full, clear, and exact description.

This invention relates to improvements in grazing-muzzles for horses or other animals, the object being to provide a muzzle of simple, light, yet strong construction that will permit the animal to pluck grass from the ground, but will prevent him from eating fruit from trees or bushes, corn from the standing stalk or on the ground, and also prevent the animal from biting trees.

I will describe a grazing-muzzle embodying my invention and then point out the novel features in the appended claims.

Reference is to be had to the accompanying drawings, forming a part of this specification, in which similar characters of reference indicate corresponding parts in both the figures.

Figure 1 is a side view of a muzzle embodying my invention as applied to a horse, and Fig. 2 is a perspective view of the muzzle.

The muzzle comprises an upper nose-band 1 and a lower nose-band 2. These bands are made of metal and are curved at the front, the side members being divergent to the back, and the said side members are connected at the back by means of rivets or otherwise. Attached to the nose-bands and extended below the same with an upward and slightly-downward curve is a fender, here shown as consisting of prongs 3. The shank portion 4 of the prongs is secured to the rear portions of the metal bands. Side guards 5, here shown as formed substantially in the shape of rings, have their shank portions 6 attached to the side members of the nose-bands. The muzzle is secured to the animal, as here shown, by means of side straps 7 and a front strap 8, connected to the neck-strap 9. When the muzzle is in position, the fender-prongs will pass underneath the mouth of the animal, and the guards 5 will pass along the sides of the mouth.

The fender will permit the animal to pluck grass from the ground, as obviously the grass will pass up between the prongs; but it will prevent the animal from picking up corn from the ground or from eating it from the standing stalks. The side guards will prevent the entrance of corn or the like to the sides of the mouth.

Having thus described my invention, I claim as new and desire to secure by Letters Patent—

1. A grazing-muzzle, comprising nose-bands, a fender extended from the rear portion of the nose-bands and below the same to pass underneath an animal's mouth, and side guards extended below the lowermost band, substantially as specified.

2. A grazing-muzzle, comprising upper and lower nose-bands, a fender consisting of forked members attached to the nose-bands and extended downward and forward to pass underneath an animal's mouth, and side guards, substantially as specified.

3. A grazing-muzzle, comprising metal nose-bands, a fender extended from the rear portion of the nose-bands and consisting of forked members, the said members being curved to pass underneath an animal's mouth, and side guards having their shanks attached to the bands, substantially as specified.

4. A grazing-muzzle, comprising metal nose-bands, a fender extended from the rear portion of the nose-bands and consisting of forked members, the said members being curved to pass underneath an animal's mouth, side guards having their shanks attached to the bands, and means for securing the device to an animal's head, substantially as specified.

5. A grazing-muzzle, a fender attached to the muzzle and curved to pass under an animal's mouth, side guards attached to the muzzle and means for securing the muzzle to an animal's head, substantially as specified.

In testimony whereof I have signed my name to this specification in the presence of two subscribing witnesses.

HENRY GREEN BANKS.

Witnesses:
H. L. BIRDSALL,
J. J. McGEE.